(12) United States Patent
Pagdin et al.

(10) Patent No.: US 7,251,829 B1
(45) Date of Patent: Jul. 31, 2007

(54) DATA ANALYSIS AND SECURITY SYSTEM

(75) Inventors: William D. Pagdin, Wantage, NJ (US); Jerry Harding, Alexandria, VA (US)

(73) Assignee: Type80 Security Software, Inc., Anderson, IN (US)

( * ) Notice: Subject to any disclaimer, the term of this patent is extended or adjusted under 35 U.S.C. 154(b) by 515 days.

(21) Appl. No.: 10/280,748

(22) Filed: Oct. 26, 2002

(51) Int. Cl.
*G06F 21/00* (2006.01)
*G08B 23/00* (2006.01)

(52) U.S. Cl. .............................. 726/22; 726/23; 726/25

(58) Field of Classification Search ................ 713/201, 713/200, 202
See application file for complete search history.

(56) References Cited

U.S. PATENT DOCUMENTS

| | | | | |
|---|---|---|---|---|
| 4,774,658 A | * | 9/1988 | Lewin .................... | 340/825.49 |
| 5,388,189 A | * | 2/1995 | Kung .......................... | 706/45 |
| 5,499,340 A | * | 3/1996 | Barritz ....................... | 714/47 |
| 5,555,191 A | * | 9/1996 | Hripcsak .................... | 709/224 |
| 5,590,056 A | * | 12/1996 | Barritz ....................... | 702/186 |
| 5,721,825 A | * | 2/1998 | Lawson et al. ............. | 709/203 |
| 5,748,098 A | * | 5/1998 | Grace .......................... | 370/242 |
| 5,748,884 A | * | 5/1998 | Royce et al. ................ | 714/57 |
| 5,826,104 A | * | 10/1998 | Rifkin ......................... | 710/15 |
| 5,867,659 A | * | 2/1999 | Otteson ...................... | 709/224 |
| 5,991,881 A | * | 11/1999 | Conklin et al. ............. | 713/201 |
| 6,202,158 B1 | * | 3/2001 | Urano et al. ................ | 726/22 |
| 6,230,198 B1 | * | 5/2001 | Dawson et al. ............. | 709/224 |
| 6,507,852 B1 | * | 1/2003 | Dempsey et al. ........... | 707/201 |
| 6,738,911 B2 | * | 5/2004 | Hayes ......................... | 713/201 |
| 2002/0138762 A1 | * | 9/2002 | Horne ......................... | 713/201 |
| 2003/0084349 A1 | * | 5/2003 | Friedrichs et al. .......... | 713/201 |
| 2003/0167406 A1 | * | 9/2003 | Beavers ....................... | 713/201 |
| 2003/0233435 A1 | * | 12/2003 | Bazinet et al. ............. | 709/223 |
| 2004/0181685 A1 | * | 9/2004 | Marwaha ..................... | 713/201 |

OTHER PUBLICATIONS

IBM, z/OS MVS System Management Facilities, 1.0 Chapter 1. Introduction, pp. 1-4, Copyright 1988-2006 <http://publibz.boulder.ibm.com/cgi-bin/bookmgr_OS390/BOOKS/IEA2G261/1.0?SHELF=EZ2ZO10G&DT=20060125090238> retrieved online Dec. 21, 2006.*
Wikipedia contributors, "IBM System Management Facilities," Wikipedia, The Free Encyclopedia, http://en.wikipedia.org/w/index.php?title=IBM_System_Management_Facilities&oldid=88576011 (accessed Dec. 21, 2006). pp. 1.*

* cited by examiner

*Primary Examiner*—Kambiz Zand
*Assistant Examiner*—Thomas Szymanski

(57) ABSTRACT

A process that collects and analyzes data from computer mainframe system events and/or messages as they occur, utilizing a System Management Facility (SMF) interface, a SubSystem Interface (SSI), an Event Notification Facility (ENF) interface, and generates alert message(s) when installation-developed rules so indicate, to provide real-time mainframe event and message monitoring, with notification to multiple targets based on either of two factors: a) configuration parameters defined by auditors and security administrators, and b) statistical analysis and correlation of historical event data (profiling).

14 Claims, 6 Drawing Sheets

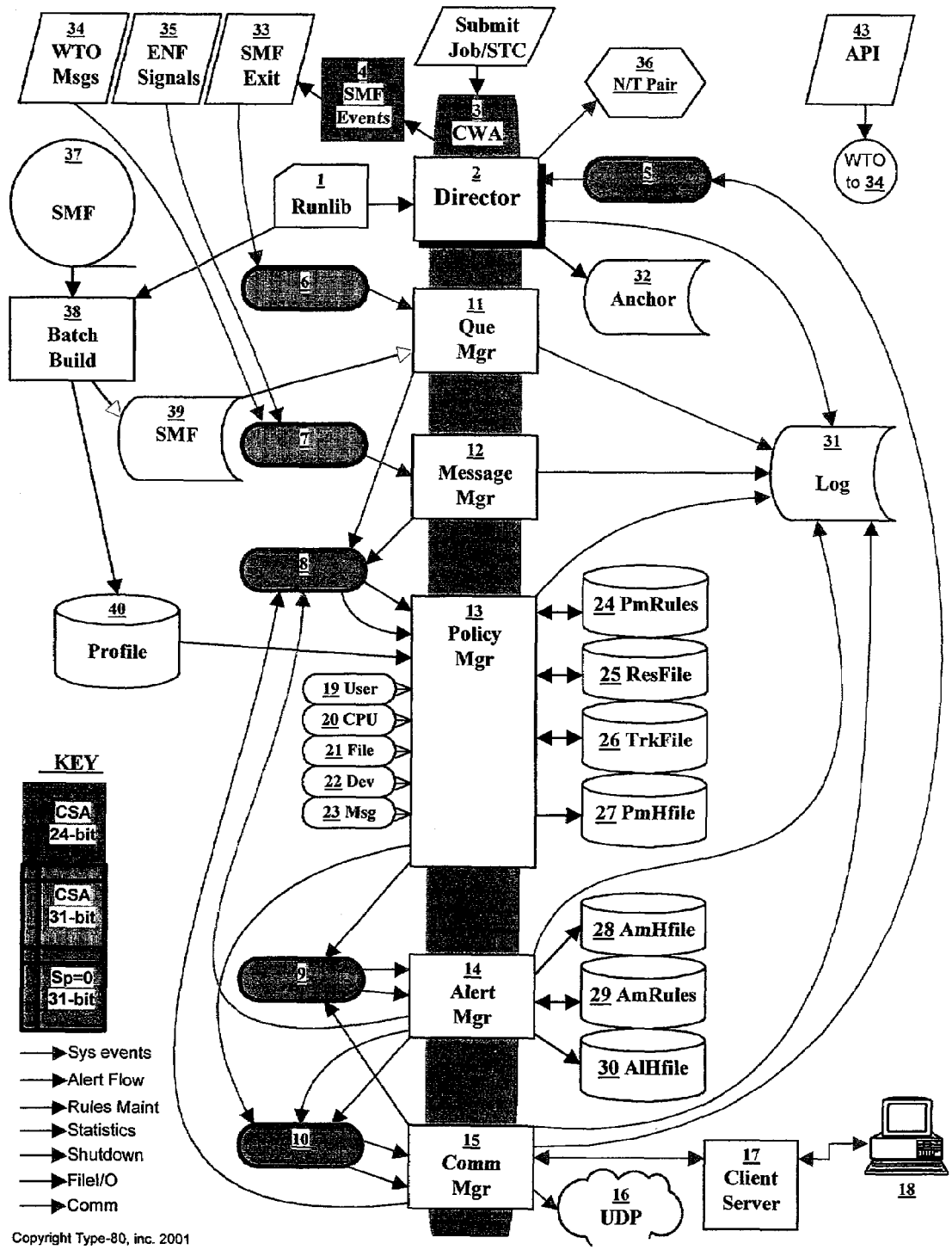
Figure-1 Configuration

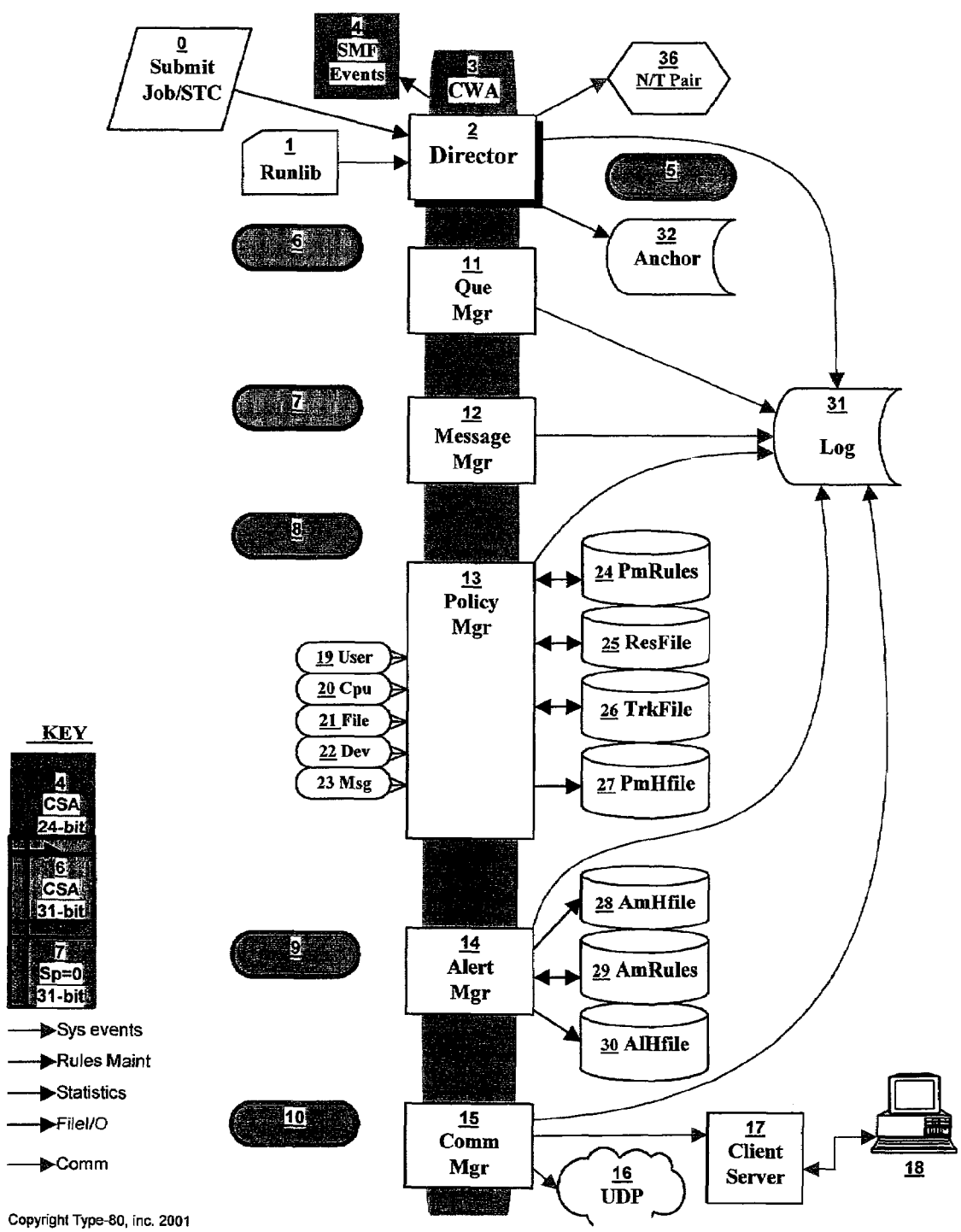
Figure-2 Initialization

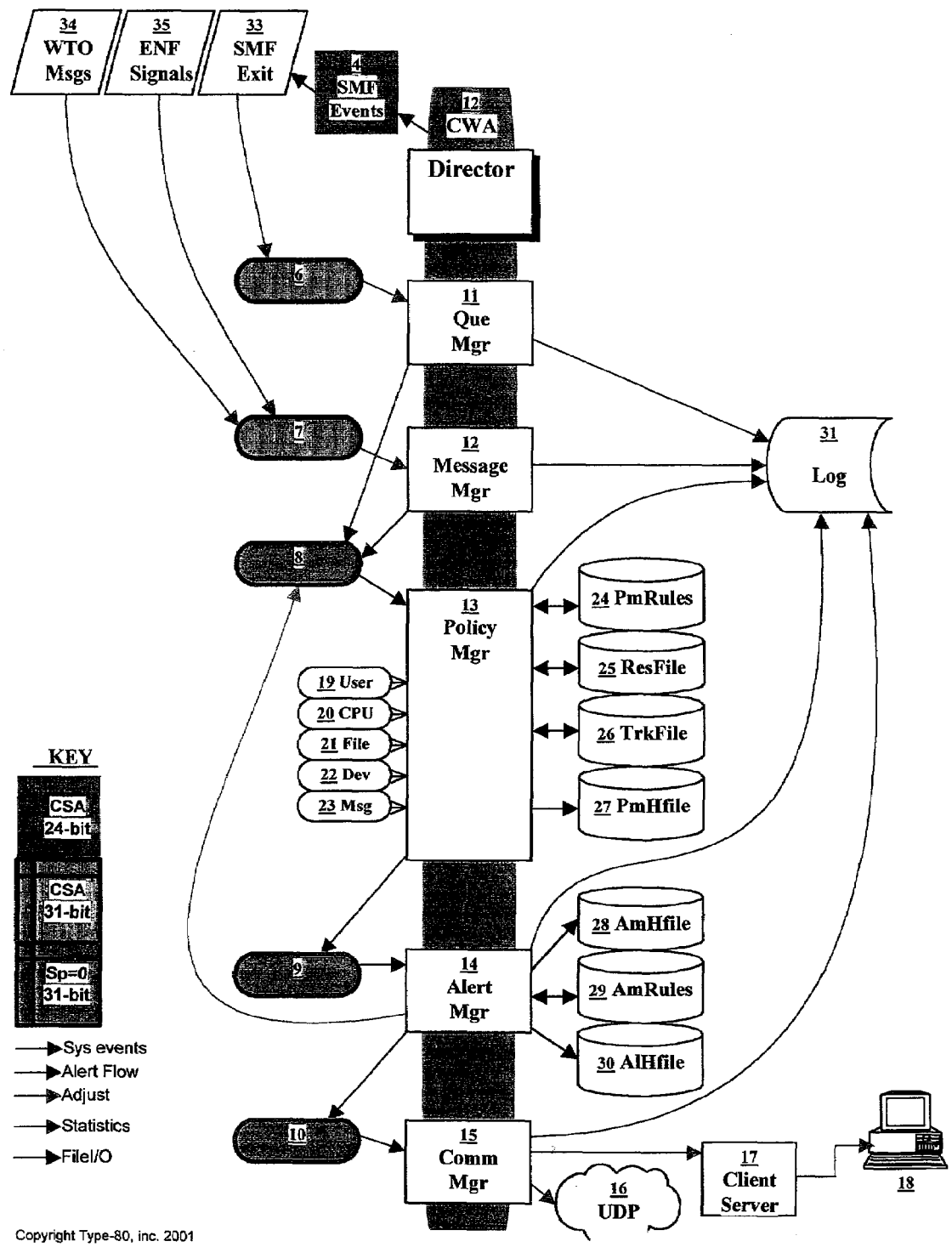
Figure-3 Process an Event

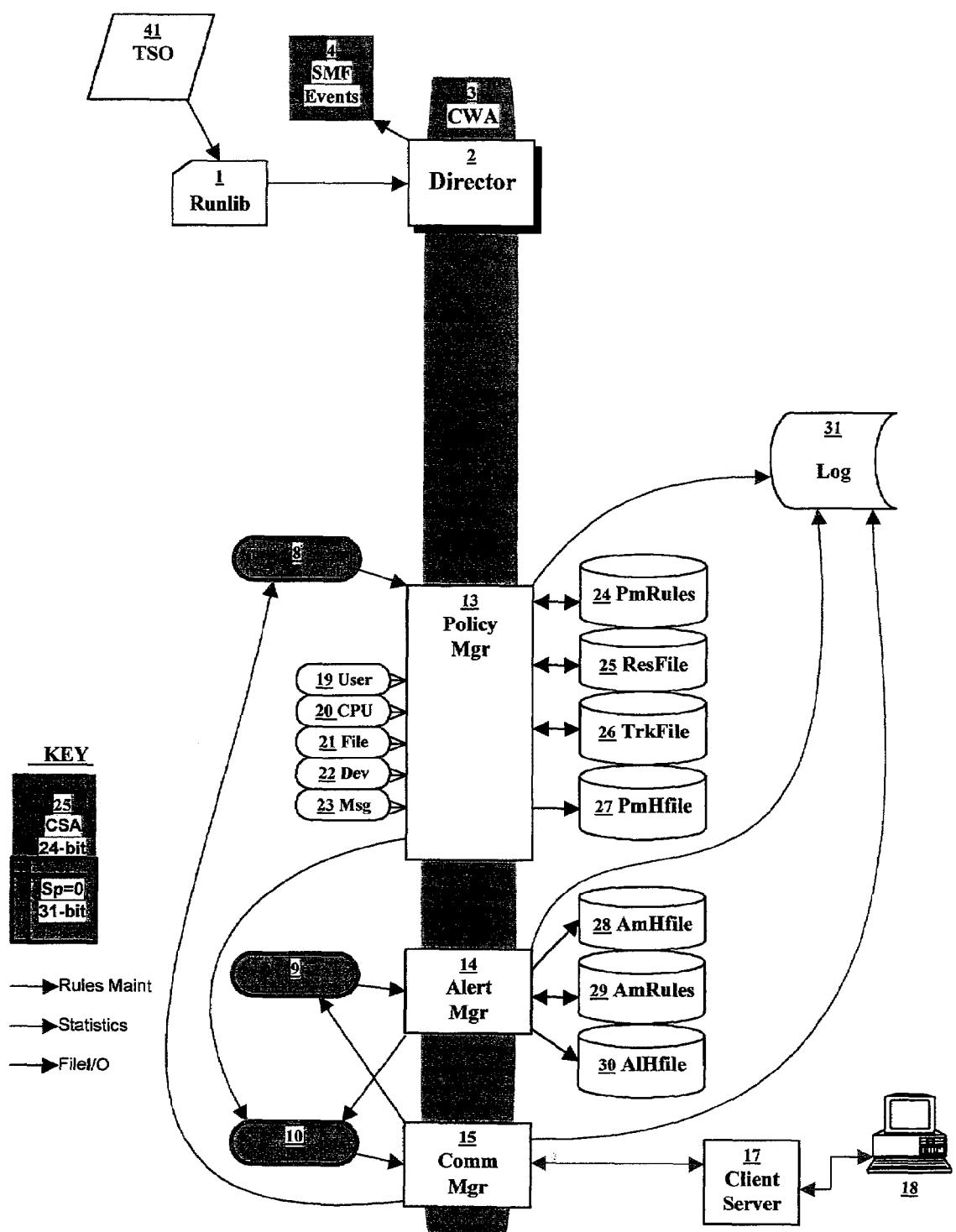
Figure-4 Maintain Rules

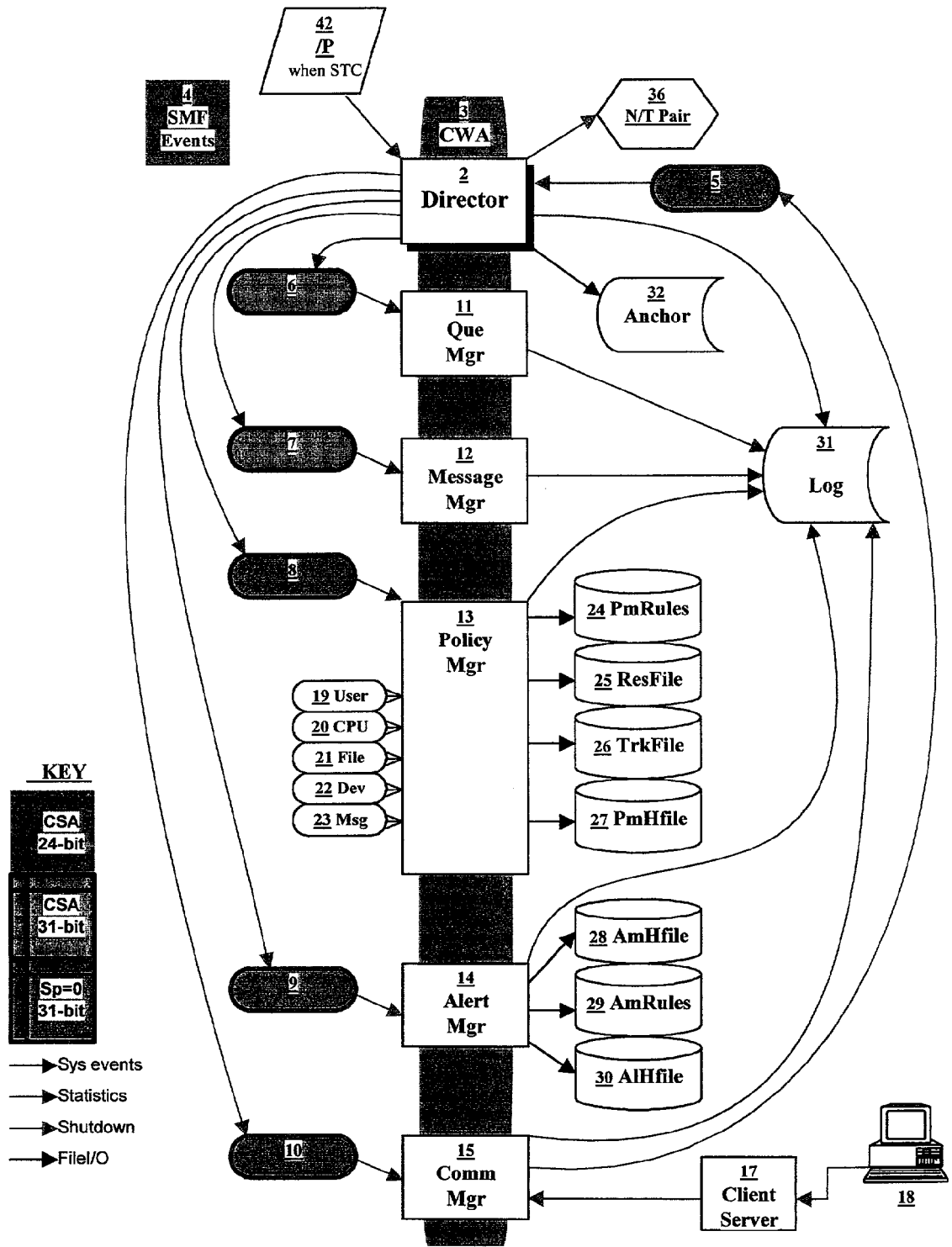

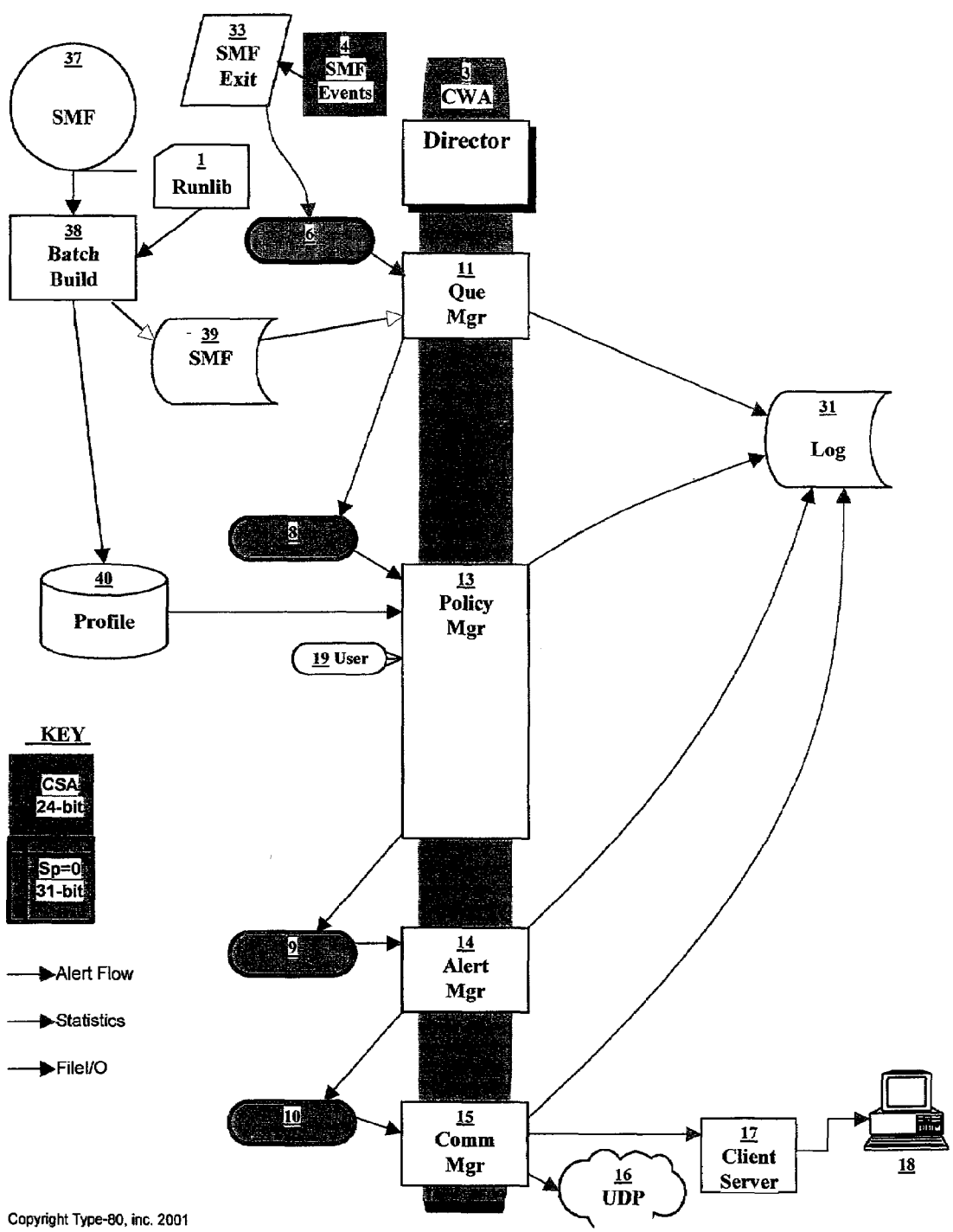
Figure-6 Profiles

DATA ANALYSIS AND SECURITY SYSTEM

BACKGROUND

This invention relates generally to the field of computer event notification and security, and more specifically, to a process on a computer that collects and analyzes data from mainframe system events and/or messages as they occur, and issues alert messages to various targets. It solves the problem of how to extract from large volumes of event and message data what data is meaningful, and how to alert security administrators and auditors according to rules they specify.

SUMMARY

In accordance with a preferred embodiment of the invention, there is disclosed: a process on a computer that collects and analyzes data from mainframe system events and/or messages as they occur; a means for collecting mainframe Operating System (herein referred to as the "OS") event-data utilizing a System Management Facility (SMF) interface; a means for collecting computer program-generated Messages, utilizing a Subsystem Interface (SSI); a means for collecting OS event-data utilizing an Event Notification Facility (ENF); a means for reformatting SMF records and ENF event-records and messages into a common layout; a means for retaining only those event-data and messages requested by an administrator and filtering out non-requested event-data and messages; a means for evaluating whether said event-data and messages are to generate an alert message; and a means to issue said alert messages to a client interface and/or other interface.

BRIEF DESCRIPTION OF FIGURES

FIG. 1 is a flow diagram showing the configuration of the components of the invention;

FIG. 2 is a flow diagram showing the invention's method of initializing the components;

FIG. 3 is a flow diagram showing the invention's method of processing a system event;

FIG. 4 is a flow diagram showing the invention's method of maintaining rules;

FIG. 5 is a flow diagram showing the invention's method of shutting down the components;

and FIG. 6 is a flow diagram showing the invention's method of using rules to analyze historical events, and creating Profiles for users based on their past activity.

DESCRIPTION

The primary advantage of the invention is to produce alert messages in real-time from Write-To-Operator (WTO) messages, from System Management Facility (SMF) records, and from ENF events, in order to distribute alert messages to various devices and targets.

Analysis of SMF records is often done using, for example, the Merrill Consultants' SAS-macros. It is done in batch mode, usually hours and often days after a suspected event, when security personnel make a request. Other events such as WTOs are likewise available in batch by a program that can read the System console log. One or two vendors have packages that listen for ENF events.

Typically in a mainframe data center, SMF records are written to a series of datasets and then collected periodically onto a dataset that can be read programmatically. WTO messages are written to the log of the program creating them and often to the console operator's log. Both SMF records and WTO messages are created at such high rates that it is virtually impossible and unreliable (and long after the fact) for there to be accurate and timely human analysis. Most of that data is not germane to event analysis, security analysis, or profile analysis.

What has been needed for years is a computer process to automate the collection and analysis of relevant event-data as those events occur, and to alert those persons and/or processes which are so designated.

This software invention utilizes, but is not limited to, OS/390 and z/OS facilities and techniques to manage the high volume of data as it happens in real-time.

FIG. 1 Shows the Configuration of the Invention.

There are four classes of components that are utilized by the invention.

The first class is comprised of OS components, which are customized extensions to the OS and execute within a Logical Partition (LPAR), and includes: SMF Exit code (33) at OS exit points IEFU83, IEFU84, IEFU85, which is passed control prior to OS writing an SMF record to its dataset (37); SSI code (34) which is passed control when there is a WTO message; and ENF (35) code which is passed control when certain OS events occur. These extensions as well as the Internet Protocol (IP) port assignments come into existence during an Initial Program Load (IPL) of the OS, having been registered by a systems programmer.

The second class is comprised of Job or Started Task (STC) components, which execute within a private address space, and includes: a Director (2) which manages various components of the invention including Initialization (FIG. 2) and Shutdown (FIG. 5); a Queue Manager (11) which processes event data from the SMF (33) component; a Message Manager (12) which processes event data from the SSI (34) and ENF (35) components; a Policy Manager (13) which evaluates event data (8) according to rules (24); an Alert Manager (14) which evaluates what action to take (if any) based on event data and Policy Manager (13) information (9) according to rules (29); and a Communications Manager (15) which sends alert messages to various targets (16, 17, 18).

The third class is comprised of an interface between OS components and Job components, and includes: a Name/Token Pair (36) which is created by Director (2) and exists only for the duration of an active Director.

The forth class is comprised of historical and analytical components, and includes: archived SMF records (37); a format conversion and analysis program Batch Build (38); extracted SMF records (39) for evaluating past events against current rules; and Profile records (40) for use in a prediction function by Policy Manager (13).

These components working conjointly provide flexibility and stability, and include: Proprietary SMF Exit modules (33); proprietary SSI modules (34); proprietary Event Notification Facility module (35); proprietary software modules (11 thru 15) that process the event data according to rules (24, 29) created by a security administrator; site-configurable parameters (1) created by a systems administrator; recoverability across IPLs due to keeping all rules and history on storage (24 thru 30, 32); recoverability from private address space crashes due to self-contained error recovery ESTAE macros; diagnostic information by writing session addresses (32) and logging session activity (31); isolation of the Operating System itself from component availability problems by exploiting the Name/Token Pair functionality (36), and by asynchronous moves of event data to queues (6 and 7); efficient Job components that multi-task the attached sub-tasks (11, 12, 13, 14, 15) within the private address space (2); being event driven via Cross Memory (XM) Posts (33 posting 11; 34 and 35 posting 12) and of being event driven via Local Memory Posts where 2, 11, 12, 13, 14, 15 post each other.

In order for the components to function together, a variety of techniques are employed which include: writing event data coming from the Operating System components (33, 34, 35) to queues (6 and 7) which are memory locations obtained from 31-bit Common Storage Area (CSA) that are shared between the OS components (33, 34, 35) and the Job components (11 and 12); Cross Memory Services POST of the respective Queue Managers (11 and 12); using 24-bit CSA (3, 4) to provide memory locations that are shared between the OS components (33, 34, 35) and the Job components (11 and 12) for the purposes of having the Event Control Blocks be in 24-bit memory and the SMF & Event tables be in 24-bit memory; acquiring memory (Getmain) from CSA (3, 4, 6, 7) and from Private sub-pool (5, 8, 9, 10); using the Name/Token Pair facility (36); using the Branch to form of some macros (2, 33, 34); having Local System (LPAR scope) Enques (2); using Attached subtasks (2 attaches 11, 12, 13, 14, 15) and Detaching same during shutdown for good housekeeping; addressing mode (24-bit/31-bit) switching (2, 11, 12, 13, 14, 15) to update sequential datasets (31, 32) and yet use 31-bit memory; Mode (supervisor/problem) switching (2) to have authority to execute certain OS functions; Transmission Control Protocol (TCP)/IP protocol (15, 17, 18); User Datagram Protocol (UDP) (15); and using a proprietary record layout (5, 8, 9, 10) to regulate the flow of data within the Job components.

The components function together to monitor system events and produce alert messages regarding a variety events, including: user-defined events (24, 25, 29); potential Security violations (33, 34, 35); dataset access (21); User Identification (id) activity (19); Central Processing Unit (CPU) id events (20); Systems Network Architecture (SNA) and IP address activity (22); WTO messages (23); and program-issued messages via an Application Programming Interface (API) (43).

Various programming languages and protocols are used, including: a Personal Computer-based language for the Server and Graphical User Interface (GUI) (17, 18); IBM's High-Level Assembler (HLASM) for the mainframe programs (33, 34, 35, 2, 11, 12, 13, 14, 15); protocol TCP/IP is the interface between the mainframe and the Server (15, 17); and UDP is the protocol when writing the industry-standard Syslog (18) format.

FIG. 2 Shows the Initialization of the Invention.

Initialization of the invention occurs at startup, when the Director (2) is submitted (0) to execute on the computer as either a Job or as a STC. Memory (3 thru 10) is obtained by the Director (2). Configuration parameters are read from the Runlib dataset (1) by the Director (2). The Director (2) uses these rules in order to: register in the SMF & Event tables (4) what SMF records to process from the choices listed at the end of the description of FIG. 2; register in the Common Work Area (CWA) (3) the TCP/IP Addresses and Port assignments and the optional dataset High-level qualifier; confirm the CPU serial number and LPAR via a License code; decide whether to use SMF (33), SSI (34) and/or ENF(35); and modify the Events table (4) based on the host security software (RACF, ACF2 or TopSecret).

The Director (2) then attaches subtasks (11 thru 15). Each subtask (11 thru 15) opens and initializes its operational datasets (24 thru 31). Existing Policy Manager (13) rules are loaded into memory (19 thru 23). The Director (2) registers in the CWA (3) various items including: the address in memory of SMF & Events tables (4); the address of the Event Control Blocks (ECB) of each Manager (2, 11 thru 15); the address of Queues (5 thru 10); the next available entry in each Queue (5 thru 10); and the Address Space Control Block (ASCB) of Queue Manager (11) and Message Manager (12). The Director (2) saves the values of the CWA (3) in storage (32). OS interfaces (SMF, SSI, ENF) (33, 34, 35) are initialized by Director (2). Communication links are opened to the Server, GUI, and UDP sockets (17, 18, 16) by Communication Manager (15). The Director (2) registers the CWA (3) address, and the Address Space Control Block addresses for Queue Manager (11) and Message Manager (12) with the Name/Token facility (36). The Director (2) sets the "Open for Business" flag in the CWA (3).

Once initialized, the software waits for the Operating System interfaces (33, 34, 35) to transfer event data.

SMF Record Types and their functions which may be requested include, but are not limited to:

14 INPUT OR RDBACK DATA SET ACTIVITY
15 OUTPUT, UPDAT, INOUT, OR OUTIN DATA SET
17 DELETE OF DATASET
30 JOB/STEP TERMINATION (BATCH, TSO, STARTED TASK)
32 TERMINATION OF TSO SESSION (OFTEN=S30)
49 SIGNON INTEGRITY ERROR
54 SIGNON INTEGRITY ERROR
56 NETWORK INTEGRITY ERROR
59 BULK DATA TRANSFER
62 VSAM OPEN
65 CATALOG SERVICES
66 IDCAMS ALTER/RENAME
67 VSAM CATALOG ENTRY DELETE
68 VSAM CATALOG ENTRY RENAME
80 SECURITY WARNING
83 SECURITY CHANGE
92 OPEN-MVS EVENTS
109, 118, 119 TCP/IP CALLS, API CALLS, TELNET and FTP SERVERS and CLIENTS.

ENF Signal types and their functions which may be requested include, but are not limited to:

31 CONFIGURATION CHANGES: DELETE DEVICE OR PATH
37 SMF PROCESSING ENDED
52 LINKLIST ACTIVATION

FIG. 3 Shows the Invention's Method of Processing a Monitored System Event From SMF (33), from SSI (34), from ENF (35).

One of the OS interfaces (33, 34, 35) is passed data and given control by some event. Each interface determines whether an active Name/Token Pair (36) has been registered for the invention. If none exists, the invention is not initialized and the interface returns control to OS. When a Name/Token Pair (36) does exist, each interface (33, 34, 35) obtains from the Name/Token Pair (36) the CWA address (3) and the corresponding program's (11 or 12) Address Space Control Block (ASCB) identification value. Each interface obtains the address of the next available entry in the respective queue (6 or 7) from the CWA (3).

For an SMF event, the SMF Exit (33) is passed the address of an SMF record, the Exit tests whether the SMF record type is to be analyzed by examining a list of eligible record types on the SMF-Event table (4). If the record is not eligible, the Exit (33) resumes waiting. If the record is eligible, it is copied to Queue Manager's (11) queue (6), and the Exit (33) wakes up (Cross-memory Posts, based on the ASCB) Queue Manager (11) which reads its queue (6) and parses the relevant fields to create a proprietary record.

For an ENF event, the ENF program (35) evaluates the signals it is to accept. If the signal is not eligible, the Exit (35) resumes waiting. If the signal is eligible, data is copied to Message Manager's (12) queue (7), and the Exit (35) wakes up (Cross-memory Posts, based on the ASCB) Message Manager (12) which reads its queue (7) and parses the relevant fields to create a proprietary record.

For a WTO event, the Message Subsystem interface (SSI) (34) evaluates whether the message type is to be accepted. If the message is not eligible, the Exit (34) resumes waiting. If the record is eligible, it is copied to Message Manager's (12) queue (7), and the Exit (34) wakes up (Cross-memory Posts, based on the ASCB) Message Manager (12) which reads its queue (7) and parses the relevant fields to create a proprietary record. In each case, the proprietary record is copied to the input queue (8) of the Policy Manager (13).

The Policy Manager (13) is activated (Posted) by the active program (11 or 12). Policy Manager uses rules (19 thru 23) to evaluate the event data. The Policy Manager (13) writes on a Tracking file (26) each record that has a rule. During event evaluation, if a rule applies to an event, a value (which is component of a rule) is added to an accumulating value in memory for an instance of the rule. For example, IF USER_thomas HAS 3 EVENTS IN 5 MINUTES, ADD 20 TO COUNTER_thomas. The proprietary record with the pertinent counter value is copied to the Alert Manager's (14) queue (9), and the Policy Manager (13) activates (Posts) the Alert Manager (14).

The Alert Manager (14) reads its queue (9) and based on its rules (29) it evaluates whether the event should be considered an alert. For example: IF COUNTER_thomas IS GREATER THAN 50, THEN ISSUE A YELLOW ALERT. or IF COUNTER_thomas IS GREATER THAN 75, THEN ISSUE A RED ALERT. If an alert is to be issued, the Alert Manager (14) copies the proprietary record to the Communication Manager's (15) queue (10), and Posts the Communication Manager (15), and retains on the Alert History file (30) what alerts were issued and what rules drove the alert. This information may be retrieved to show a history of events and rules in effect.

The Communication Manager (15) reads the record from its queue (10), reformats the alert message and sends it to the GUI (17, 18) and/or UDP interface (16). After handling an Event, the software waits for another presentation of event data.

FIG. 4 Shows the Invention's Method of Maintaining two Different, but Related, Types of Rules.

For initialization rules, an administrator using TSO (41) creates parameters in Runlib (1) which are processed by the Director (2) at startup (FIG-2). The specific parms are described in a User Guide.

For alert evaluation rules, an administrator using the Graphical User Interface (GUI) (18) Adds, Deletes, Changes the Resource Definitions (25) and the Policy Rules (24) via the connected Client (17) to the Communication Manager (15) to either Policy Manager (13) or Alert Manager (14). Changed or deleted rules are written to a Rule History file (27, 28). Policy Manager (13) keeps all current rules in memory (19 thru 23) for high performance.

FIG. 5 Shows the Invention's Two Methods of Shutting Down the Components.

In method one, an administrator using the GUI (18 to 17 to 15 to 5) issues a termination command. In method 2 for a started task only, a console operator (42) issues a purge command, which is communicated to the Director (2)

In either case, the Director (2) inactivates the Name/Token Pair (36), which immediately causes the System Event exits (33, 34, 35) to cease passing event data. The Director (2) sets the "Closed" flag in the CWA (3) and Posts each subtasks (11 thru 15).

Each subtask (11 thru 15) updates its respective activity log (31) and closes its datasets (24 thru 30) and ceases to be a subtask.

The Director (2), once all subtasks are finished, releases all storage (3 thru 10), and updates the Anchor status file (32). The Director (2) updates its log (31) and is finished.

FIG. 6 Shows the Invention's Two Methods of Processing Historical SMF Records.

A batch process (38) reads SMF historical records (37) and filters them based on the Runlib parameters (1). The process creates a filtered but unchanged set of SMF records (39) and/or a filtered and reformatted set of profile records (40). The filtered set of SMF records (39) is used to test historical events against rules to see what would have triggered an alert.

The proprietary format profile records (40) are used to evaluate newly arriving SMF records (33) to determine whether an unregistered user (one having no applicable user rule (19)) is doing something unusual. The Policy Manager (13) reads the Profile dataset (40) and builds Profile entries in memory for Users (19) who are not within the scope of any rule (24). When current events (33, 34, 35) match against said Profile entries, the Policy Manager (13) statistically determines whether the current event is outside the profile for that User. When a current event is out of profile, a Profile alert is written to the Alert Manager's (14) queue (9).

The Alert Manager (14) copies the proprietary record to the Communication Manager's (15) queue (10), and Posts the Communication Manager (15).

The Communication Manager (15) reads the record from its queue (10), reformats the Profile alert message and sends it to the GUI (17, 18) and/or UDP interface (16). After handling an Event the software waits for another presentation of event data.

The invention claimed is:

1. A system for collecting and analyzing data from system events and/or messages as they occur in real time, comprising:
    computer processor means for processing data;
    storage means for storing data on a storage medium;
    means for collecting Operating System event-data utilizing a System Management Facility (SMF) interface;
    means for collecting computer program-generated Messages, utilizing a SubSystem Interface (SSI);
    means for collecting Operating System event-data utilizing an Event Notification Facility (ENF);
    means for reformatting SMF records by Queue Manager, and messages and ENF event-records by Message Manager into a proprietary layout;
    means for retaining only those event-data and messages requested by an administrator, and filtering out non-requested event-data and messages;
    means for evaluating whether those retained event-data and messages are to generate an alert message;
    means for distribution of an alert message to a client/server/graphical user interface or to a TCP/IP port or other device such as a UDP port;
    means for developing, adding, changing, deleting rules which are used to evaluate event-data and messages;
    means for evaluating whether historical event-data should have generated an alert message; and means for specifying what qualifies as event-data and messages.

2. The system of claim 1, further comprising a program at exit points IEFU83 and/or IEFU84 and/or IEFU85 used to copy requested records.

3. The system of claim 1, and further comprising: a program which is registered with the SubSystem Interface which initializes an OS vector table that requests control when a message is being sent and that names a message handling program to be given control to evaluate and copy certain messages.

4. The system of claim 1 wherein the means for collecting uses an ENF program used to copy requested events.

5. The system of claim 1 wherein a Policy Manager evaluates all said transformed records based on rules supplied by an administrator.

6. The system of claim 1 wherein an Alert Manager evaluates a transformed record and a computed monitored value according to related rules.

7. The system of claim 1 and further comprising a GUI and a Client/server interface to a Communications Manager is used to signal Policy Manager and Alert Manager of view, add, change, delete requests for rules.

8. The system of claim 1 and further comprising a product program Batch Profile Extract which transforms historical (non-exit, non-real-time) event records and writes them to an historical profile dataset for use wherein the transformed records are evaluated whether they would have generated an alert message based on current rules facilitating making refinements to current rules and/or refinements to the historical time period of event records extracted, to the end that both rules and event selection become most suitable to identifying past and present anomalies (unusual activity).

9. The system of claim 1 provide real-time mainframe event and message monitoring, with alert generation to multiple targets based on either of two factors: a) configuration parameters defined by auditors and security administrators, and b) statistical analysis and correlation of historical event data (profiling).

10. The system of claim 3 and further comprising a product program Message Manager which is signaled by said message handling program.

11. The system of claim 4 wherein said ENF program signals a waiting product program Message Manager.

12. The system of claim 5 wherein when a said transformed record matches a rule, a value is computed to determine whether to escalate the importance of the event or message.

13. The system of claim 6 wherein a Communications Manager transforms an alert message and corresponding rules to conform with TCP/IP protocol.

14. The system of claim 8 and further comprising proprietary product program logic wherein statistical calculations determine whether real-time events are statistically significant when compared to said historical profiles.

* * * * *

UNITED STATES PATENT AND TRADEMARK OFFICE
Certificate

Patent No. 7,251,829 B1

Patented: July 31, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: William D. Pagdin, Wantage, NJ (US); Jerry Harding, Alexandria, VA (US); and Erik C. Goggans, Alexandria, VA (US).

Signed and Sealed this Twenty-first Day of February 2012.

TOD SWANN
*Supervisory Patent Examiner*
Art Unit 2403
Technology Center 2400